United States Patent
Sotir et al.

(10) Patent No.: US 10,286,973 B2
(45) Date of Patent: May 14, 2019

(54) BICYCLE HANDLEBAR FOLDING MECHANISM

(71) Applicant: GM Global Technology Operations LLC, Detroit, MI (US)

(72) Inventors: Radu D. Sotir, Toronto (CA); George C. Floarea, Whitby (CA); David Begleiter, Toronto (CA); Hung H. Nguyen, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/421,966

(22) Filed: Feb. 1, 2017

(65) Prior Publication Data

US 2017/0259873 A1     Sep. 14, 2017

Related U.S. Application Data

(60) Provisional application No. 62/306,175, filed on Mar. 10, 2016.

(51) Int. Cl.
| | |
|---|---|
| *B62K 21/16* | (2006.01) |
| *G05G 5/06* | (2006.01) |
| *B62K 15/00* | (2006.01) |
| *B62K 21/12* | (2006.01) |

(52) U.S. Cl.
CPC ............ *B62K 21/16* (2013.01); *B62K 15/006* (2013.01); *B62K 21/12* (2013.01); *G05G 5/06* (2013.01)

(58) Field of Classification Search
CPC ........ B62K 21/12; B62K 21/16; B62K 21/18; B62K 21/22; B62K 11/14; Y10T 74/20792; Y10T 74/20798; Y10T 74/2078; Y10T 74/20822; G05G 5/005; G05G 5/06; G05G 5/28
See application file for complete search history.

(56) References Cited

U.S. PATENT DOCUMENTS

| | | | | |
|---|---|---|---|---|
| 575,266 | A * | 1/1897 | McCollum | ............. B62K 21/16 74/551.5 |
| 663,195 | A * | 12/1900 | McGuire | ................ B62K 21/16 403/93 |
| 2,438,657 | A * | 3/1948 | Dufaux | .................. B62K 21/16 74/551.5 |
| 4,614,454 | A * | 9/1986 | Kassai | ...................... B62B 7/08 16/324 |

(Continued)

FOREIGN PATENT DOCUMENTS

| | | |
|---|---|---|
| CN | 2224149 Y | 4/1996 |
| CN | 103269936 A | 8/2013 |

OTHER PUBLICATIONS

State Intellectual Property Office of the Peoples Republic of China, Office Action for Chinese Patent Application No. 201710116950.4 dated Oct. 31, 2018.

*Primary Examiner* — Richard W Ridley
*Assistant Examiner* — Brian J McGovern
(74) *Attorney, Agent, or Firm* — Lorenz & Kopf, LLP

(57) ABSTRACT

A product may include a pair of handles that may be foldable. A wedge may be engaged between the pair of handles and may lock the pair of handles in a first position. A release mechanism may be connected to the wedge. Operation of the release mechanism may move the wedge to disengage from and to unlock the handles and may enable moving the pair of handles to a folded position.

19 Claims, 3 Drawing Sheets

(56) References Cited

U.S. PATENT DOCUMENTS

| | | | | |
|---|---|---|---|---|
| 4,682,509 A | * | 7/1987 | Takamiya | B62K 21/16 403/97 |
| 6,234,042 B1 | * | 5/2001 | An | B62K 21/16 74/551.3 |
| 2015/0033904 A1 | * | 2/2015 | Chu | B62K 21/16 74/551.4 |
| 2016/0347398 A1 | * | 12/2016 | Wang | B62K 21/16 |

* cited by examiner

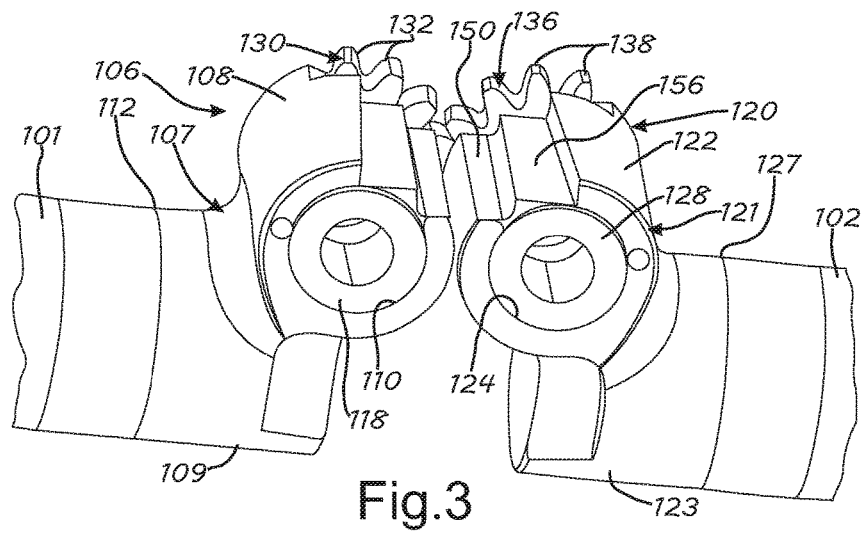
Fig.3
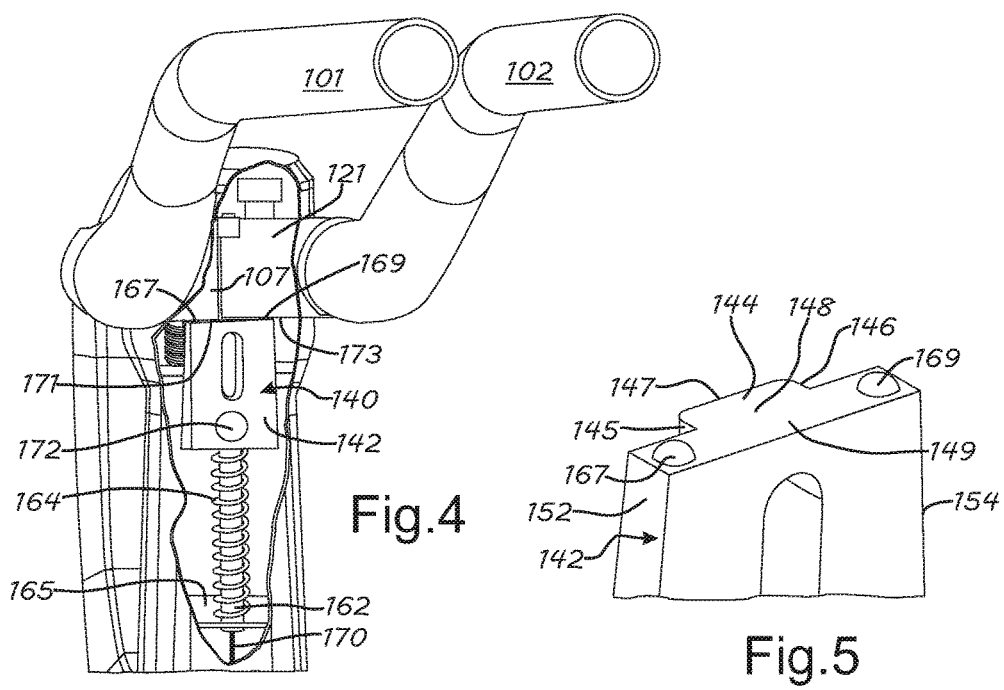
Fig.4
Fig.5 ns of the system of FIG. 2, according to a number of variations.

BICYCLE HANDLEBAR FOLDING MECHANISM

CROSS-REFERENCE TO RELATED APPLICATIONS

This application claims the benefit of U.S. Provisional Application No. 62/306,175 filed Mar. 10, 2016.

TECHNICAL FIELD

The field to which the disclosure generally relates includes cycles, and more particularly, includes cycles with folding capability.

BACKGROUND

A variety of manually operated products may include handles that may be grasped to manipulate the product, or to provide manual input to affect operations of the product. The handles may take a number of forms that may be readily gripped, and that may include dual extending structures that enable two handed operation. The length and shape of the handles may be selected to provide a comfortable grip arrangement and/or to provide a mechanical advantage in moving components of the product, and as such may take up space.

SUMMARY OF ILLUSTRATIVE VARIATIONS

A number of illustrative variations may involve a product that may include a pair of foldable handles. Folding may reduce the space the handles occupy. A wedge may be engaged between the pair of handles and may lock the pair of handles in a first position. A release mechanism may be connected to the wedge. Operation of the release mechanism may move the wedge to disengage from, and to unlock the handles. Unlocking may enable moving the pair of handles to a folded position A number of additional variations may involve a product that may include a handle. A knuckle may be included on one end of the handle. The knuckle may define an opening. A pin may extend through the opening. The handle may be rotatable about the pin. Another handle may include a second knuckle on one end. The second knuckle may define a second opening. A second pin may extend through the second opening. The other handle may be rotatable about the second pin. A wedge may be engageable between the knuckles to lock the handles in position.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 illustrates a part of the handlebar locking mechanism of the system of FIG. 2 with the wedge removed, in perspective view according to a number of variations.

FIG. 4 illustrates in fragmentary view, the handlebar area of a cycle using the system of FIG. 2, in a folded position according to a number of variations.

FIG. 5 illustrates a part of the wedge for the handlebar locking mechanism of FIG. 3 according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
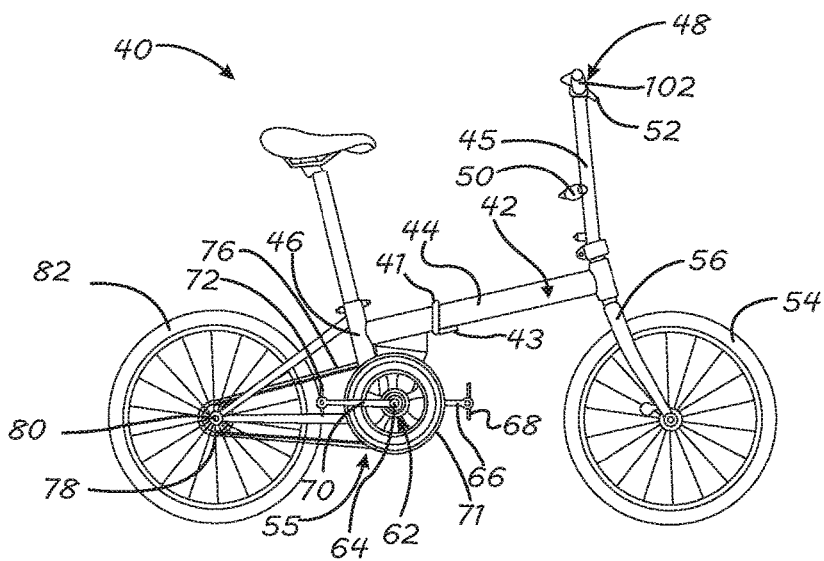
FIG. 1 illustrates a cycle according to a number of variations.

FIG. 1 illustrates a number of variations which may include a cycle 40. In any of a number of variations, the cycle 40 may include a frame 42 which may include a main tube 44 connected to a seat tube 46. The main tube 44 may include a hinged joint 41 to enable folding the frame 42, so that the cycle 40 may be more easily transported and stored. A latch release 43 may unlatch the joint 41. Additional joints may be included to facilitate folding of the frame 42 into a reduced package size for storage or transport. A steering tube 45 may extend from the main tube 44. The steering tube 45 may be operatively connected to a front fork 56 which may be attached to a front wheel 54. A handlebar assembly 48 may be attached to the steering tube 45 and may be used to control the direction of the front wheel 54 by way of the front fork 56. The handlebar assembly 48 may include a handle 102 in the foreground of FIG. 1, and may include an opposed handle 101 (shown in FIG. 2), in the background of FIG. 1. Control mechanisms 50 may be provided on the cycle 40, such as on the handlebars assembly 48, on the steering tube 45 as shown, or on other parts of the frame 42. The control mechanisms 50 may be constructed and arranged to communicate with one or more input receiving or control devices of the cycle 40. The one or more input receiving or control devices may include, latches, release mechanisms, other mechanical devices, or other mechanisms that may include electronic devices such as to receive input signals and/or communicate data. The one or more input receiving or control devices may effect functions or operations in response to inputs from the control mechanisms, and/or may further communicate with various components of the cycle 40. In a number of variations, the control mechanisms 50 may be located on other parts of the frame 42, in combination with, or as an alternative to, the steering tube 45 or the handlebar assembly 48. The control mechanisms 50 may be levers, knobs, other human interface devices, or other mechanisms that may be manually manipulated. The single or plural control mechanisms 50 may communicate with controlled devices in a number of ways such as through mechanical links, electrical conductors, or wireless connections.

The cycle 40 may include a propulsion system 55 that may operate on manual inputs, motor powered inputs, or a combination thereof. The propulsion system 55 may include a crank assembly 62 which may include a crankshaft 64 that may be connected with a first pedal assembly 66 and a second pedal assembly 70. The first pedal assembly 66 may include a first foot pedal 68, and the second pedal assembly 70 may include a second foot pedal 72. A linked element 71, which may be a sprocket or a pulley or another device for linking with a drive wheel 82, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of the drive wheel 82. The drive wheel 82 may be a road wheel in-that it contacts the surface upon which the cycle 40 operates. The linked element 78 may be a sprocket or pulley or another device suitable for engaging with the linking member 76. The cycle 40 may be a bicycle, tricycle, or four-wheel cycle having the crank assembly 62 constructed and arranged to allow a rider to provide input thereto using the first pedal assembly 66 and the second pedal assembly 70, and may include a motor powered unit that may be packaged in the propulsion system 55.

Figure 2:
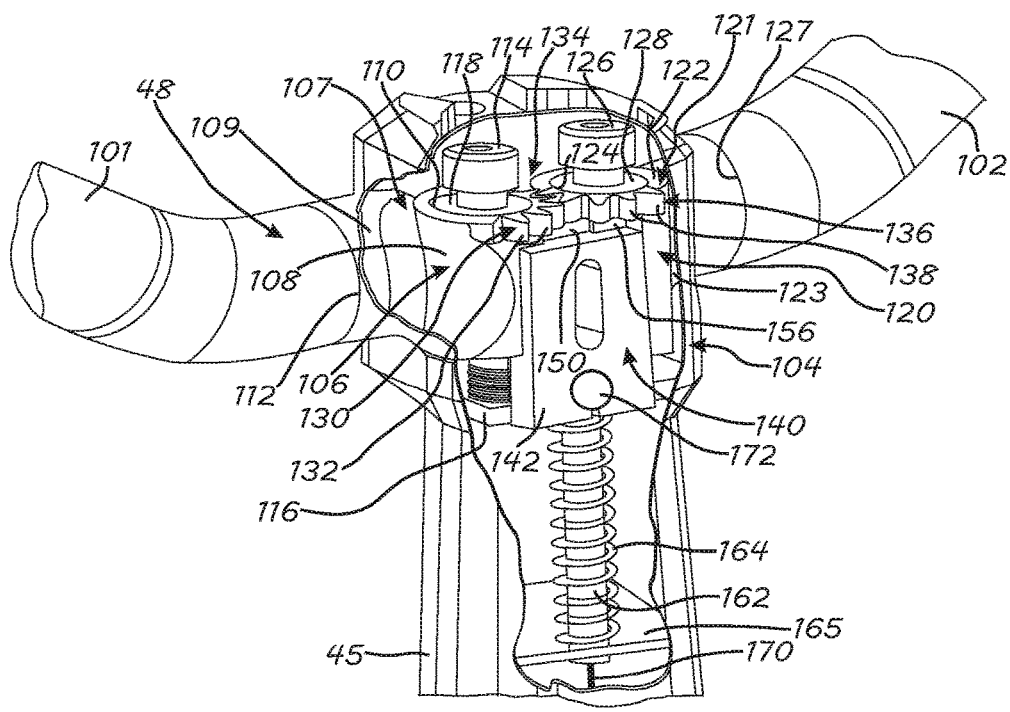
FIG. 2 illustrates a handlebar system in fragmentary view, for use with the cycle of FIG. 1, according to a number of variations.
Figure 7:
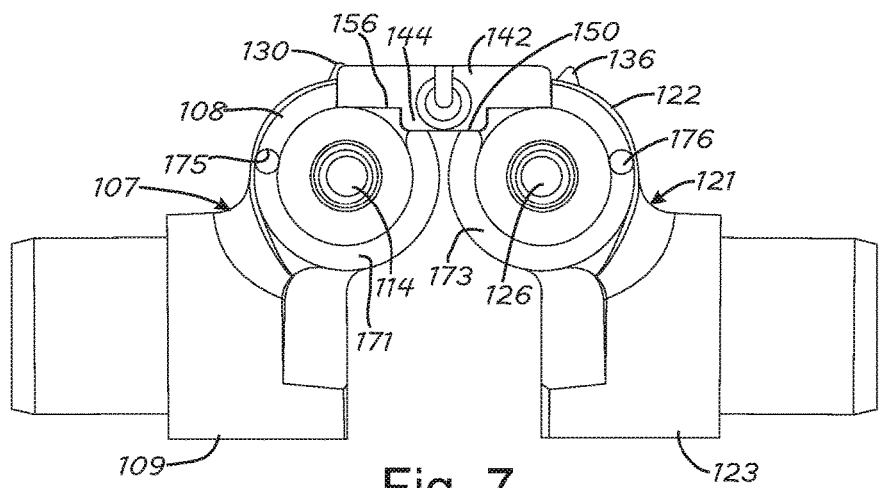
FIG. 7 illustrates a perspective view of a knuckle area of a handlebar locking mechanism of the system of FIG. 2, with the handles removed according to a number of variations.

In a number of variations as further illustrated in FIG. 2, the handlebar assembly 48 of the cycle 40 may include a handle 101 and a handle 102, each extending from a center post assembly 104. The center post assembly 104 may be located at the top of the steering tube 45 of the cycle 40. The handles 101 and 102 may extend in opposed directions away from the center post assembly 104 and may be used individually, or in tandem, to manually turn the steering tube 45 and the connected wheel 54. With additional reference to FIG. 3, the handle 101 may be connected to, or formed with, a joint 106, which may be a knuckle type joint. The joint 106 may include a knuckle 107 with an eye 108 that may include an opening 110 that may extend completely through the eye 108. The opening 110 may be disposed through the eye 108 in an orientation that may be substantially perpendicular to the end 112 of the handle 101. The knuckle 107 may include a post 109 extending from the eye 108, that may be connected to the handle 101 or that may be formed therewith. In the orientation shown in FIG. 2, the opening 110 may extend through the eye 108 in a substantially vertical direction that may be perpendicular to the post 109. A pin 114 may extend through the opening 110 and may be fixed to the center post assembly 104 such as at a plate 116. A bearing 118 may be disposed in the opening 110 between the eye 108 and the pin 114. The bearing 118 may be separate from the eye 108 and the pin 114, or may be a part of one and/or the other. The eye 108 and the connected post 109 and handle 101 may be rotatable about the pin 114, and therefore, may be rotated relative to the main tube 44, and may be rotatable relative to the steering tube 45. Similarly, the handle 102 may be connected to, or formed with, a joint 120, which may also be a knuckle type joint. The joint 120 may include a knuckle 121 with an eye 122 that may include an opening 124 that may extend completely through the eye 122. The opening 124 may be disposed through the eye 122 in an orientation that may be substantially perpendicular to the end 127 of the handle 102. The knuckle 121 may include a post 123 extending from the eye 108, that may be connected to the handle 102 or that may be formed therewith. In the orientation shown in FIG. 2, the opening 124 may extend through the eye 122 in a substantially vertical direction, which may be perpendicular to the post 123. In a number of variations the posts 109, 123 may include a segment with a reduced cross sectional area (as shown in FIG. 7), onto which the handles 101, 102 may be positioned, with the segment received within the respective handle. A pin 126 may extend through the opening 124 and may be fixed to the center post assembly 104 such as at a plate 116. A bearing 128 may be disposed in the opening 124 between the eye 122 and the pin 126. The bearing 128 may be separate from the eye 122 and the pin 126, or may be a part of one and/or the other. The eye 122 and the connected post 123 and handle 102 may be rotatable about the pin 126, and therefore, may be rotated relative to the main tube 44, and may be rotatable relative to the steering tube 45. In a number of variations the pins 114, 126 may be bolts with enlarged heads disposed on one side of the eyes 108, 122, and on the opposite side the bolts may be threaded into the plate 116. The pins 114, 126 may retain the handles 101, 102 on the center post assembly 104.

In a number of variations the knuckle 107 may have a gear section 130 that may be on the eye 108. The gear section 130 may have a number of teeth 132. The gear section 130 may be disposed on the eye 108 at and around the center area 134 of the center post assembly 104. The gear section 130 may be formed as part of, or fixed to, the eye 108. Similarly, the knuckle 121 may have a gear section 136 on the eye 122. The gear section 136 may include a number of teeth 138. The gear section 136 may be disposed on the eye 122 at and around the center area 134 of the center post assembly 104. The gear section 136 may be formed as part of, or fixed to, the eye 122. The gear section 136 may be engaged with the gear section 130 with the teeth 138 in meshing contact with the teeth 132. As a result, rotation of the handle 101 about the pin 114 may drive rotation of the handle 102 through the meshing teeth 132, 138. Similarly, rotation of the handle 102 about the pin 126 may drive rotation of the handle 101 through the meshing teeth 138, 132. In other words, the handles 101 and 102 may be rotated in a synchronized action, with input provided to one or both of the handles 101, 102. This may enable one handed folding of the handles 101, 102 into a folded position as shown in FIG. 4. When folded, the handles 101, 102 may be disposed substantially parallel to one another, and may extend over the frame 42 of the cycle 40, while the wheel 54 remains straight forward. The folded handles 101, 102 may occupy a narrow lateral space sideways across the cycle 40 as compared to the unfolded operative steering position of FIG. 2.

Figure 6:
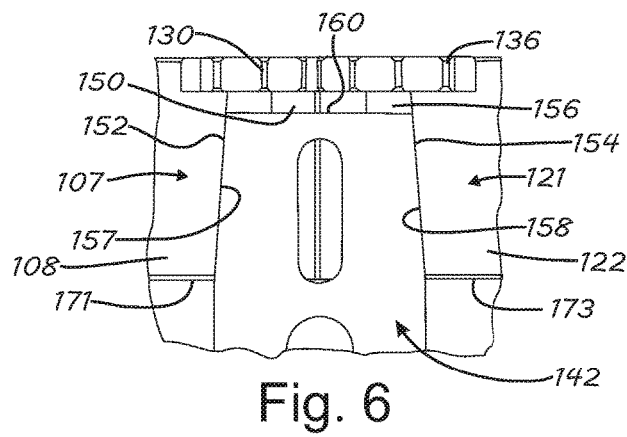
FIG. 6 illustrates part of the handlebar locking mechanism of the system of FIG. 2, according to a number of variations.

In a number of variations the handles 101 and 102 may be locked in the operative steering position shown in FIG. 2. A lock assembly 140 may engage between the eyes 108, 122 and may prevent rotation of the knuckles 107, 121. The lock assembly 140 may include a wedge 142. As shown in FIG. 5, the wedge 142 may include a guide 144. The guide 144 may include side walls 145 and 146 with a flat wall 147 extending between the side walls 145, 146. The guide 144, at its base 148, may connect with the main body 149 of the wedge 142. The guide 144 may engage in a keyway 150 formed in the eyes 108, 122 as shown in FIGS. 2, 6 and 7. The engagement between the wedge 142 and the eyes 108, 122 may lock the wedge 142 to the knuckles 107, 121 when the handles 101 and 102 are in the operative steering position of FIG. 2. With reference to FIG. 6, the outboard edges 152 and 154 of the wedge 142 may be engaged in a slot 156 formed by the eyes 108, 122. The edges 157 and 158 of the slot 156 may mate against the edges 152 and 154 respectively, of the wedge 142 to act as a stop against rotation of the handles 101 and 102 toward each other. The wedge 142 may be tapered, becoming narrower toward its terminal end 160. The slot 156 may be similarly tapered. The wedge 142 may slide into the slot 156 with a wedge-like action. The gear sections 130, 136 may be located spaced apart from the wedge 142 to avoid interference. The keyway 150 may be formed in the eyes 108, 122 within the slot 156. As the wedge 142 is drawn down out of the slot 156, the guide 144 may slide in the keyway 150. This may maintain the wedge 142 in alignment as its outboard edges 152, 154 may separate from the edges 157 and 158 of the slot 156.

In a number of variations the wedge 142 may be connected with a shaft 162 (shown in FIGS. 2 and 4), that may be contained in the center post assembly 104 and may slide therein. A spring 164 may extend between the wedge 142 and a stop 165 and may surround the shaft 162. The spring 164 may act to force the wedge 142 into the slot 156 to lock the handles 101, 102 in the operative steering position of FIG. 2. The wedge 142 may move into the slot 156 in an automatic locking action under the force of the spring 164 when the handles 101 and 102 are unfolded. The wedge 142 may include retaining features that may take the form of projections 167, 169 (shown in FIG. 5), that may engage in the undersides 171, 173 of the eyes 108, 122 respectively. With reference to FIG. 7, the knuckle 121 for example, may include a depression 176 in the eye 122 that has a shape matching the shape of the projection 169 to provide the mating retention feature. The knuckle 107 may include a depression 175 in the eye 108 that has a shape matching the shape of the projection 167 to provide the mating retention feature. The projections 167, 169 may act as detents in the depressions 175, 176 respectively, in the knuckles 107, 121, and may assist in retaining the handles 101, 102 in the folded position of FIG. 4, when entering the depressions 175, 176. The handles 101, 102 may be rotated to the steering position of FIG. 2 by applying force to overcome the friction to slide the projections 167, 169 out of the depressions 175, 176.

Figure 8:
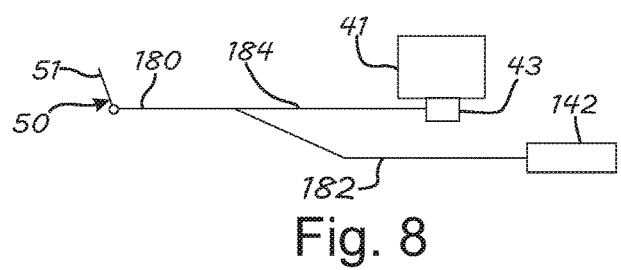
FIG. 8 is a schematic illustration of a release mechanism of the system of FIG. 2, according to a number of variations.

In a number of variations, the shaft 162 (shown in FIGS. 2 and 4) may be hollow or tubular and a cable 170 may extend through the shaft 162 and may include an enlarged end 172 connected with the wedge 142. The cable 170 may be connected with the control mechanism 50, which may be remote from the wedge 142. Actuation of the control mechanism 50 may pull the cable 170 and may move the wedge 142 to compress the spring 164 to unlock the handles 101, 102 by movement of the wedge 142 to the unlocked position thereof as shown in FIG. 4. With the handles 101, 102 unlocked, they may be manually folded into the position of FIG. 4. This release mechanism for the handles 101, 102 may be operated through a single operator such as by providing a lever as the control mechanism 50. In a number of variations, the control mechanism 50 may be connected with both the hinged joint 41 and the wedge 142 so that multiple releases may be effected by a single operation. For example, as shown schematically in FIG. 8, the control mechanism 50 may comprise a lever 51 that may be connected with the wedge 142 through cable with segments 180, 182. The lever 51 may also be connected with a latch release 43 of the joint 41 through the cable segment 180, and a cable segment 184. Operation of the lever 51 may simultaneously move the wedge 142 to unlock the handles 101, 102 for folding thereof, and may move the latch release 43 to unlatch the joint 41 for folding of the frame 42. In a number of variations, additional joints may be connected to the cable 180 if desired.

Through the variations described above, steering of a cycle 40 may be provided with limited play through handles 101, 102, which may be folded into a compact package, and which may be unfolded into a solid locked condition.

Meshing gear sections 130, 136 may synchronize movement of the handles 101, 102 to provide one handed folding and to assist in providing a robust assembly. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a pair of handles that may be foldable. A wedge may be engaged between the pair of handles and may lock the pair of handles in a first position. A release mechanism may be connected to the wedge. Operation of the release mechanism may move the wedge to disengage from and to unlock the handles and may enable moving the pair of handles to a folded position.

Variation 2 may include the product according to variation 1 wherein the release mechanism may include a control mechanism in communication with the wedge. The release mechanism may be located at a remote location from the wedge.

Variation 3 may include the product according to variation 1 wherein the pair of handles may define a slot into which the wedge may engage to minimize play between the pair of handles.

Variation 4 may include the product according to variation 3 wherein the pair of handles may define a keyway in the slot. A guide may extend from the wedge, and the guide may engage in the keyway.

Variation 5 may include the product according to variation 1 wherein a spring may engage the wedge and may automatically force the wedge to lock the pair of handles.

Variation 6 may include the product according to variation 1 wherein each of the pair of handles may have an eye. A pin may extend through each eye. Each one of the pair of handles may rotate about one of the pins.

Variation 7 may include the product according to variation 1 wherein a gear section may be included on each eye. The gear sections may mesh with one another so that the pair of handles may rotate synchronously.

Variation 8 may include the product according to variation 1 and may include a cycle that may include a frame with a joint enabling folding of the cycle. The release mechanism may be connected to both the wedge and the joint to simultaneously unlock both.

Variation 9 may involve a product that may include a first handle. A first knuckle may be included on one end of the first handle. The first knuckle may define a first opening. A first pin may extend through the first opening. The first handle may be rotatable about the first pin. A second handle may include a second knuckle on one end of the second handle. The second knuckle may define a second opening. A second pin may extend through the second opening. The second handle may be rotatable about the second pin. A wedge may be engageable in between the first and second knuckles to lock the first and second handles in position.

Variation 10 may include the product according to variation 9 wherein a cable may be connected with the wedge. A control mechanism may be connected with the cable. The control mechanism may move the wedge through the cable, unlocking first and second handles.

Variation 11 may include the product according to variation 9 wherein the first and second handles may cooperate to define a slot into which the wedge may engage.

Variation 12 may include the product according to variation 9 wherein the first and second handles may define a keyway within the slot. A guide may extend from the wedge, and may engage in the keyway.

Variation 13 may include the product according to variation 9 and may include a spring that may engage the wedge. The spring may force the wedge to lock the first and second handles.

Variation 14 may include the product according to variation 9 wherein the wedge may be moveable to unlock the first and second handles to move to a folded position. The wedge may have a first projection that may engage with the first knuckle in the folded position. The wedge may have a second projection that may engage with the second knuckle in the folded position. The first and second projections may retain the first and second handles in the folded position.

Variation 15 may include the product according to variation 9 and may include a gear section on each of the first and second knuckles. The gear sections may mesh with one another so that the pair of handles may rotate synchronously.

Variation 16 may include the product according to variation 9 and may include a wheel. The first and second handles may be connected to the wheel to steer the wheel.

Variation 17 may include the product according to variation 9 wherein the first and second handles may be moved to a first position where they may be locked by the wedge and where they may extend in opposition directions away from one another. The handles may be moved to a second position where they may be folded and may be disposed parallel to one another where they may extend in a common direction.

Variation 18 may include the product according to variation 17 and may include a cycle frame to which the first and second handles may be connected. When in the second position, the first and second handles may extend over the cycle frame.

Variation 19 may include the product according to variation 9 and may include a center post assembly. A wheel may be connected to the center post assembly. The first and second pins may be connected to the center post assembly and may comprise a sole connection mechanism between the first and second handles and the center post assembly.

Variation 20 may include the product according to variation 19 and may include a plate in the center post assembly. The first and second pins may be bolts threaded into the plate.

The above description of select variations within the scope of the invention is merely illustrative in nature and, thus, variations or variants thereof are not to be regarded as a departure from the spirit and scope of the invention.

What is claimed is:

1. A product comprising:
   a first handle and a second handle that are each foldable about a respective folding axis;
   the first and second handles together defining a slot with the first handle defining a first part of the slot and the second handle defining a second part of the slot;
   a wedge engageable between and against the first and second handles in the slot in a locking position, the wedge is configured to lock the first and second handles in a steering position of the first and second handles, and the wedge is configured to selectively move to an unlocking position to disengage from and unlock the first and second handles to enable moving the first and second handles to a folded position;
   the wedge is configured to move along a locking direction parallel to the respective folding axes when the wedge moves from the unlocking position to the locking position;
   the wedge includes a first outboard edge, a second outboard edge, and a terminal end;
   the first and second outboard edges are tapered along the locking direction toward the terminal end such that the first and second outboard edges become closer to one another toward the terminal end.

2. The product according to claim 1, comprising: a control lever in communication with the wedge, and a cable connecting the control lever with the wedge, wherein the control lever is located at a remote location from the wedge and is configured to move the wedge through the cable.

3. The product according to claim 1, wherein the wedge is configured to engage in the slot to minimize play between the first and second handles with the first outboard edge wedged against the first handle and the second outboard edge wedged against the second handle when the wedge is in the locking position.

4. The product according to claim 3, wherein:
   the first and second handles together define a keyway extending from the slot;
   a guide extending from the wedge, the guide engaging in the keyway when the wedge is in the locking position.

5. The product according to claim 1, comprising: a shaft extending from the wedge and a spring engaging the wedge, encircling the shaft, and biasing the wedge toward the locking position to lock the first and second handles in the steering position.

6. The product according to claim 1, wherein each of the first and second handles includes a respective eye having a respective pin extending through the respective eye.

7. The product according to claim 6, wherein each of the first and second handles includes a respective gear section, the respective gear sections meshing with one another so that the first and second handles are configured to rotate synchronously so that folding one of the first and second handles moves the other of the first and second handles.

8. The product according to claim 1, comprising: a cycle that includes a frame with a joint enabling folding of the cycle, wherein the joint includes a latch release configured to unlatch the joint, and comprising a release lever connected to the wedge by a first cable segment, and wherein the release lever is connected to the latch release by a second cable segment.

9. A product comprising:
   a wheel;
   a first handle;
   a first knuckle disposed on the first handle and defining a first opening;
   a first pin extending through the first opening, wherein the first handle is configured to rotate about a first folding axis of the first pin;
   a second handle, wherein the first and second handles are configured to steer the wheel;
   a second knuckle disposed on the second handle and defining a second opening;
   a second pin extending through the second opening, wherein the second handle is configured to rotate about a second folding axis of the second pin;
   a wedge configured to move along a locking direction parallel to the first and second folding axes when the wedge moves between an unlocking position and a locking position; and the wedge includes a first outboard edge, a second outboard edge, and a terminal end;

the first and second outboard edges are tapered along the locking direction toward the terminal end such that the first and second outboard edges become closer to one another toward the terminal end; and the first and second handles configured to rotate to a folded position when the wedge is in the unlocking position and disengaged from the first and second knuckles, wherein the first and second handles are disposed substantially parallel to one another and pointing in a common direction while the wheel is in a straight forward position.

10. The product according to claim 9, comprising: a cable connected with the wedge and connected with a control lever, wherein the control lever is configured to move the wedge through the cable to unlock the first and second handles.

11. The product according to claim 9, wherein the first and second handles cooperate to define a slot into which the wedge engages, wherein the first knuckle includes a first eye that defines the first opening and includes a first gear section at one end of the first eye, wherein the second knuckle includes a second eye that defines the second opening and includes a second gear section at one end of the second eye, wherein the first and second gear sections mesh together and the first and second eyes are spaced apart from one another; wherein the first and second eyes together define the slot and the slot extends along the first and second eyes and terminates at the first and second gear sections, wherein the wedge is configured to engage in the slot to lock the first and second handles in an operative steering position.

12. The product according to claim 9, wherein the first and second handles cooperate to define a keyway extending from the slot and comprising a guide extending from the wedge, wherein the guide engages in the keyway, wherein the guide is configured to slide against the first and second handles in the keyway to guide the wedge.

13. The product according to claim 9, comprising: a spring engaging the wedge, the spring configured to force the wedge against the first and second knuckles to lock the first and second handles, wherein a shaft extends from the wedge and through the spring.

14. The product according to claim 9 wherein:

the wedge includes a first projection and a second projection, the first knuckle defines a first depression and the second knuckle defines a second depression, and wherein the wedge is configured to retain the first and second handles in the folded position with the first projection engaging in the first depression and the second projection engaging in the second depression.

15. The product according to claim 9 comprising:

a first gear section on the first knuckle; and a second gear section on the second knuckle that meshes with the first gear section, the first and second gear sections configured to cause the first and second handles to rotate synchronously.

16. The product according to claim 9, wherein the first and second handles are connected to the wheel to steer the wheel.

17. The product according to claim 9, wherein the first and second handles are configured to move between an operative steering position locked by the wedge with the first and second handles extending in opposition directions away from one another, and the folded position where the first and second handles are folded and disposed parallel to one another extending in a common direction.

18. The product according to claim 17, comprising: a cycle frame to which the first and second handles are connected, wherein when in the folded position, the first and second handles extend over the cycle frame.

19. The product according to claim 9 comprising:

a center post assembly and the wheel is connected to the center post assembly;

wherein the first and second pins are connected to the center post assembly and the first and second pins are configured to affect a connection between the first and second handles and the center post assembly.

* * * * *